Nov. 3, 1931.  C. P. WILSON ET AL  1,830,180

FRUIT TREATING APPARATUS

Filed March 5, 1928   6 Sheets-Sheet 1

Patented Nov. 3, 1931

1,830,180

UNITED STATES PATENT OFFICE

CLARENCE P. WILSON, OF ONTARIO, AND ROBERT D. NEDVIDEK, OF POMONA, CALIFORNIA, ASSIGNORS TO CALIFORNIA FRUIT GROWERS EXCHANGE, OF LOS ANGELES, CALIFORNIA, A CORPORATION OF CALIFORNIA

FRUIT TREATING APPARATUS

Application filed March 5, 1928. Serial No. 259,138.

Our invention relates to the fruit packing art, and particularly to processes therein in which the fruit is passed through one or more treating liquids.

In packing fruits for shipment, it is generally necessary to wash the fruit to render it more salable. In many cases, the fruit is also passed through a liquid such as a fungicide or a deterrent to the formation of certain dangerous molds so that the fruit will remain unspoiled throughout the long journeys which much of it must make before reaching the places where it can be advantageously marketed. Such liquid treatments are particularly necessary in packing citrus fruits and, for illustrative purposes, we will describe our invention when used in connection with the packing of oranges.

When ripening on the trees, oranges collect a coating of dirt, particularly on their upper halves, the removal of which dirt is the first step in packing the oranges. The cleaning process includes soaking the oranges in a bath of strong soap solution and brushing off the dirt softened by this soaking in a special orange washer.

Leaving the washer, the oranges pass through a rinsing spray of fresh water and into a tank containing a liquid which retards decay of the oranges by killing or retarding the growth of any mold spores carried thereby. Examples of such liquids in general use at present for this purpose are solutions of borax and solutions of sodium bicarbonate. In fact, many fungicides might be used as decay retardants, but for convenience in disclosing the invention, this treating bath will be described as comprising a solution of borax.

In the packing process generally followed, the oranges are removed from the borax bath, rinsed by a spray of fresh water, and enter a drier in which all water is removed from the surfaces of the oranges, after which the oranges are sized, wrapped, and packed in boxes for shipment.

In the washing and boraxing steps of the packing process outlined above, the soap and borax solutions become so filled with dirt and mold spores in one or two days of continuous use that they are discarded and fresh solutions are prepared with which to continue the packing process. This frequent renewal of these solutions constitutes a considerable item of expense in the total packing costs. Moreover, unless an outfall sewer is available, these solutions will ultimately be discharged onto land which will tend to become alkaline or otherwise toxic to plants and non-productive after a certain amount of these solutions have been absorbed thereby.

It is correspondingly an object of our invention to provide a method of and apparatus for applying a liquid treatment to fruit in which a treating liquid may be kept in use for a relatively long period before its renewal is required.

It is the customary practice to discharge the used rinse water, containing soap or borax, into the sewer so that there is a constant loss of these substances. This must be offset by adding, at short intervals, quantities of soap or borax to the treating solutions.

It is a further object of our invention to provide a method of and apparatus for applying a liquid treatment to fruit in which losses of treating liquid in the rinse water are substantially eliminated.

In the present practice, the borax solution is not completely rinsed from the oranges so that specks of crystallized borax sometimes appear on the fruit after it is dried. This spoils the appearance of the fruit and decreases its value.

It is yet another object of our invention to provide a method of and apparatus for applying a liquid treatment to fruit in which a treating liquid is practically entirely removed from the fruit at the conclusion of the process.

Further objects and advantages will be made manifest in the following description taken in connection with the accompanying drawings in which.

Referring specifically to the drawings, and particularly to Fig. 1, 2, 3, and 4:

A liquid treating apparatus 10 includes a soaking tank 11, a washer 12, a borax tank 13, a clarifier 14, and a wiper 15, all of which are mounted upon a floor 16.

The soaking tank 11 is adapted to contain a warm solution of soap. Mounted on the sides of the tank 11 is a submerger 19 which includes a slat-belt 20 rotatably mounted on long pulleys 21 and provided with transversely extending paddles 22 which extend into the soap solution in the tank 11 as the belt 20 is rotated in the direction of the arrow 23 at a slow rate by a suitable driving means. Connecting the intake end of a centrifugal circulating pump 25 with a manifold pipe 26, and disposed in the right-hand end of the tank 11, is a pipe 27. Connecting a perforated pipe 28 in the left-hand end of the tank 11 with the discharge end of the pump 25 is a pipe 29 having a valve 30. For a purpose to be described later, a soap spray pipe 31, having a valve 32, connects with the pipe 29. It is thus seen that when the pump 25 is operated, a flow of the soap solution in the tank 11 is set up in the direction of an arrow 33, in which direction the paddles 22 on the lower flight of the slat-belt 20 travel beneath the surface of the soap solution in the tank 11. The current of soap solution thus set up assists in carrying any oranges dumped into the left-hand end of the tank 11 so that they will be submerged and carried by the submerger 19 to the right-hand end of the tank 11 where they are allowed to rise to the surface of the soap solution. The floor of the tank 11 slopes to a central point therein where the tank is connected through a fitting 36, a valve 37, and a pipe 38 to a sewer pipe 39 which extends longitudinally underneath the tank 11, the washer 12, the borax tank 13 and the wiper 15. Connected to the fitting 36, for a purpose to be described later, is a pipe 40 having a valve 41.

The washer 12 includes a housing 50, a bottom 51 of which is preferably formed of metal and has a left-hand drain pipe 52 and a right-hand drain pipe 53. The drain pipe 53 has a valve 54 and connects with the sewer pipe 39. Mounted in the housing 50, with their axes lying in a single horizontal plane, is a plurality of rotary brushes 55. Suitable means are provided for rotating the brushes 55 in the same direction, and thread-like formations 56, provided on the exterior of these brushes, effect a feeding action whereby oranges, placed on the brushes 55 at their left-hand ends, are rotated by the brushes 55 and fed by the threads 56 along the entire length of the brushes to the right-hand ends thereof.

With one of its ends extending into the soap solution in the tank 11, and with its opposite end disposed above the left-hand end of the rotary brushes 55, is a roll-conveyer 60 which is provided with suitable mounting and rotating means so that oranges, carried by the submerger 20 into the right-hand end of the tank 11, are conveyed by the conveyer 60 onto the left-hand end of the brushes 55.

The pipe 31, previously mentioned, extends upward and connects with a perforated soap solution spray pipe 61 which is disposed laterally across the left-hand end of the washer 12 so that when the valve 32 is open slightly, the pump 25 will cause soap solution to be sprayed from the perforated pipe 61 onto the left-hand ends of the brushes 55. Disposed transversely across the washer 12 is a perforated rinse pipe 64 which is connected to a water main 65 so that fresh water is continually sprayed from the pipe 64 onto the brushes 55 at a short distance from the right-hand end of these brushes.

The borax tank 13 is almost identical in construction with the soaking tank 11, and has a submerger 68 of the same character as the submerger 20, mounted on the sides thereof. Mounted on the floor 16, at the right-hand end of the borax tank 13, is a centrifugal pump 69, the intake end of which is connected to a perforated pipe 70 disposed in the right-hand end of the tank 13, and the discharge end of the pump 69 is connected by a pipe 71 with a perforated pipe 72 disposed in the left-hand end of the borax tank 13. The pipe 71 has a valve 73 and is connected with a pipe 74 having a valve 75, for a purpose to be described hereafter. The borax tank 13 contains a solution of borax which almost fills the tank.

Disposed between the washer 12 and the borax tank 13 is a chute or gravity conveyer 78, formed of slats, which is adapted to convey oranges, discharged from the right-hand ends of the brushes 55, into the left-hand end of the borax tank 13.

When the valve 75 is substantially closed and the pump 69 operated, a current of borax solution is set up from left to right in the borax tank 13. As the submerger 68 rotates slowly in the direction of the arrow 80, the blades thereof submerge and carry oranges discharged from the conveyer 78 from the left end to the right end of the tank 13.

Disposed beneath the gravity conveyer 78, and draining into the right-hand end of the washer housing bottom 51, is a drip pan 82. The bottom of the tank 13 slopes toward a central point therein where the tank connects with a drain pipe 83 having a valve 84 and a fitting 86. Connected with the fitting 86, for a purpose to be described hereafter, is a pipe 87 having a valve 88.

The clarifier 14 is of a standard type, such as used for clarifying liquids of suspended matter, and includes a centrifuge 90 driven by a motor 91 and having an intake pipe 92 and an outlet pipe 93. The intake pipe 92 has a valve 95 and is connected to the discharge pipe 96 of a centrifugal pump 97. The discharge pipe 96 has a valve 98 and connects with a storage tank pipe 99 having a valve 100. The pipe 99 leads to a storage tank 101.

Disposed beneath the drain pipe 52 of the washer housing bottom 51 is a collecting tank 105, which drains into a pipe 106 having a valve 107 which connects with a pipe 108 having a valve 109 and which in turn connects with the intake end of the centrifugal pump 97.

The pipe 108 also connects with the pipe 40. The pipe 87 also connects with the intake end of the pump 97.

By leaving certain of the valves 41, 88, 107, and 109 closed, and other of these valves open, liquid may be drawn into the intake end of the pump 97 from any one or any group of the tanks 11, 13, or 105. The outlet pipe 93 of the clarifier 14 is connected through a valve 112 to a pipe 113 which discharges into the soaking tank 11, and through a valve 114 to a pipe 115 which discharges into the borax tank 13.

The operation of the clarifier 14 in conjunction with the soaking tank 11, the washer 12 and the borax tank 13, is as follows:

As oranges are fed through the apparatus 10, the soap solution in the tank 11 gradually becomes filled with dirt and other matter washed from the surfaces of the oranges passing therethrough, so that the action of this solution becomes considerably less effective, and the solution becomes very foul smelling because of the development of putrefactive organisms necessitating, under the present practice, that this solution be drained into the sewer at the end of one to eight days' continuous operation. In our apparatus, however, we provide for the clarifying of the soap solution in the tank 11 by the clarifier 14. This may be accomplished by continuous operation of the clarifier 14, or by operating this intermittently.

In the method of continuously clarifying the soap solution, the valves 37, 88, 100, 107, and 114 are closed, while the valves 41, 109, 95, 98, and 112 are open. The centrifugal pump 97 is operated and the motor 91 is energized so as to set in operation the centrifuge 90 of the clarifier 14. The pump 97 then draws soap solution from the bottom of the soaking tank 11 and forces this upward into the lower end of the centrifuge 90. The soap solution is clarified in the centrifuge and returned through the outlet pipe 93 and the pipe 13 into the soaking tank 11. As the dirt in suspension in the soaking solution tends to settle to the bottom, the dirtiest of the soap solution is constantly drawn out of the tank 11 and passed through the clarifier, and the suspended dirt removed therefrom. This keeps the soap solution at all times clean and in an active state so that it is effective in removing the dirt from the stream of oranges passing through the tank 11. Bacteria mold spores and other dead and living organisms are removed with the other dirt and sediment.

The intermittent method of clarifying the soap solution in the tank 11 permits the soap solution to remain in use for a period of several hours at a time without being clarified, and then either clarifying, as indicated above, or shutting down the apparatus 10 and clarifying this entire body of soap solution in the tank 11 at once. This is accomplished by having the valves 37, 88, 95, 107, and 114 closed, and the valves 41, 98, 100, and 109 open. The pump 97 is now operated so as to draw all of the soap solution from the tank 11 and force this through the discharge pipe 96 and the storage tank pipe 99 into the storage tank 101 which is situated at an elevation above the clarifier 14. The valves 41, 109, and 98 are now closed and the operation of the pump 97 discontinued. The valve 95 is now opened and the clarifier 14 is set in operation. The soap solution thus passes by gravity through the pipe 99 and the intake pipe 92 into the centrifuge 90, where it is clarified and discharged through the pipes 93 and 113 into the soaking tank 11.

While the soap solution is stored in the storage tank 101 and after the valve 41 has been shut, the sewer valve 37 is opened and the tank 11 is cleaned out with a hose and broom or other suitable and effective means so that all the dirt and slime adhering to the inner surface of the tank passes through the pipe 38 into the pipe 39. After the tank 11 is thus cleaned, the valve 37 is closed and the soap solution in the tank 101 is clarified and returned to the soaking tank 11.

When operating continually over fairly long periods of time, the continuous process of clarification is preferable, but when it is customary to shut down the apparatus 10 at noon and at night, the intermittent process may be used, the clarification being accomplished when the apparatus is normally not being operated.

The soap solution, sprayed from the manifold 61 on the left-hand ends of the brushes 55, is flung from these brushes against the inner walls of the housing 50, and drains through the pipe 52 into the collecting tank 105. From time to time, as this collecting tank fills with soap solution, the valve 107 is opened while the pump 97 is removing soap solution from the soaking tank 11 for its clarification. The suction of the pump 97 causes the soap solution in the tank 105 to be drawn from the pipe 106 into the pipe 108, so that the tank 105 is emptied, after which the valve 107 is again closed. The soap solution thus drawn from the tank 105 is of course clarified and returned to the soaking tank 11 in the manner previously described. This soap solution may be conveniently sterilized by heat or other suitable means during its passage from the clarifier back to the soaking tank 11.

By division of the floor 51 of the housing 50, so that the left-hand portion thereof may be drained separately from the right-hand portion of this floor, the drippings of strong soap solution from the brushes 55 are recovered, as above described, and the amount of soap solution which passes into the sewer with the rinse water is relatively small. In the past, all the soap solution drained from the brushes 55 has been allowed to pass into the sewer on account of the great amount of dirt contained in this solution. In the apparatus 10, however, by far the greater portion of this solution is salvaged.

As fruit leaves the washer 12 on the gravity conveyer 78, a certain amount of soap-impregnated rinse water drips from this conveyer. This water is collected upon the drip pan 82 and returned to the right-hand end of the housing floor 51 of the washer 12, from which it passes with the rest of the used rinse water into the sewer. A certain amount of soap, however, is carried by the fruit into the borax solution in the borax tank 13. This soap, together with particles of oranges crushed in the washer 12 and delivered into the borax solution, and also mycelial growth, mold spores, bacteria, and organisms which grow in the borax solution, such as sporotrichum, cladosporium, etc., cause the borax solution to become filled with suspended matter after a certain period of operation of the apparatus 10, so as to again cause the fruit to become dirty or to impair the effectiveness of this solution in preventing decay of the fruit passing therethrough which, of course, is the primary purpose of the borax treatment. It is, therefore, the purpose of our invention to utilize the clarifier 14 to clarify the borax solution in the tank 13, in a manner similar to that used in clarifying the solution in the soaking tank 11, so that the borax solution may be continued in use over a practically indefinite period of time, thereby eliminating the necessity of discarding the borax solution after two or three days, thus avoiding the danger to vegetation and saving the cost of renewing the borax solution at such frequent intervals.

The clarification of the borax solution may also be accomplished by either continuous or intermittent operation of the clarifier 14. To continuously clarify the borax solution, the valves 84, 109, 100, and 112 are closed, and valves 88, 98, 95, and 114 are opened. The pump 97 and the clarifier 14 are now set in operation and the borax solution is drawn from the tank 13 through the pipe 87 and discharged through the pipes 96 and 92 into the centrifuge 90 and, after being clarified in the centrifuge, is returned through the pipes 93 and 115 into the borax tank 13. Obviously, however, the soap solution in the soaking tank 11 and the borax solution in the tank 13 cannot both be continuously clarified by the clarifier 14, and in case it is more desirable to continually clarify the soap solution during the operation of the apparatus 10, the borax solution will be clarified intermittently, while the apparatus 10 is shut down in the following manner:

The valves 84, 109, 95, and 112 will be closed and the valves 88, 98, and 100 opened. The pump 97 is now set in operation so as to draw the borax solution from the tank 13 and force this into the storage tank 101. This being completed, the valves 88 and 98 are closed and the operation of the pump 97 discontinued. The valves 95 and 114 are now opened and the clarifier 14 set in operation so that the borax solution is drawn from the storage tank 101, clarified and returned to the tank 13. While the borax solution is stored in the tank 101, the valve 84 would of course be opened and the tank 13 cleaned out in a similar manner as previously mentioned regarding the soaking tank 11, after which, the valve 84 would again be closed so that the tank 13 would be ready to receive the clarified borax solution.

The economy effected by the clarifying of the treating solutions in the apparatus 10 results in a considerable reduction of the total cost of packing fruit. Moreover, owing to the fact that the sewage from the packing house is nearly all discharged onto land and that soap and borax have a decidedly detrimental effect upon the fertility of soil, our invention also saves the land upon which the sewage is run from being ultimately made barren by the accumulation of soap and borax thereon.

In the present practice of packing oranges, the oranges are removed from the borax tank 13 and without the oranges being given more than a very short time for draining the borax solution therefrom, they are passed under a fresh water rinse spray, and used rinse carrying the borax solution is washed from the oranges and discarded. We have discovered that the loss of borax solution from this source amounts to a considerable item of expense and is a source of injury to the land upon which the discarded solution is deposited, as previously mentioned. The loss of borax solution from this source is eliminated in our apparatus 10 by the fruit wiper 15.

Figure 1:
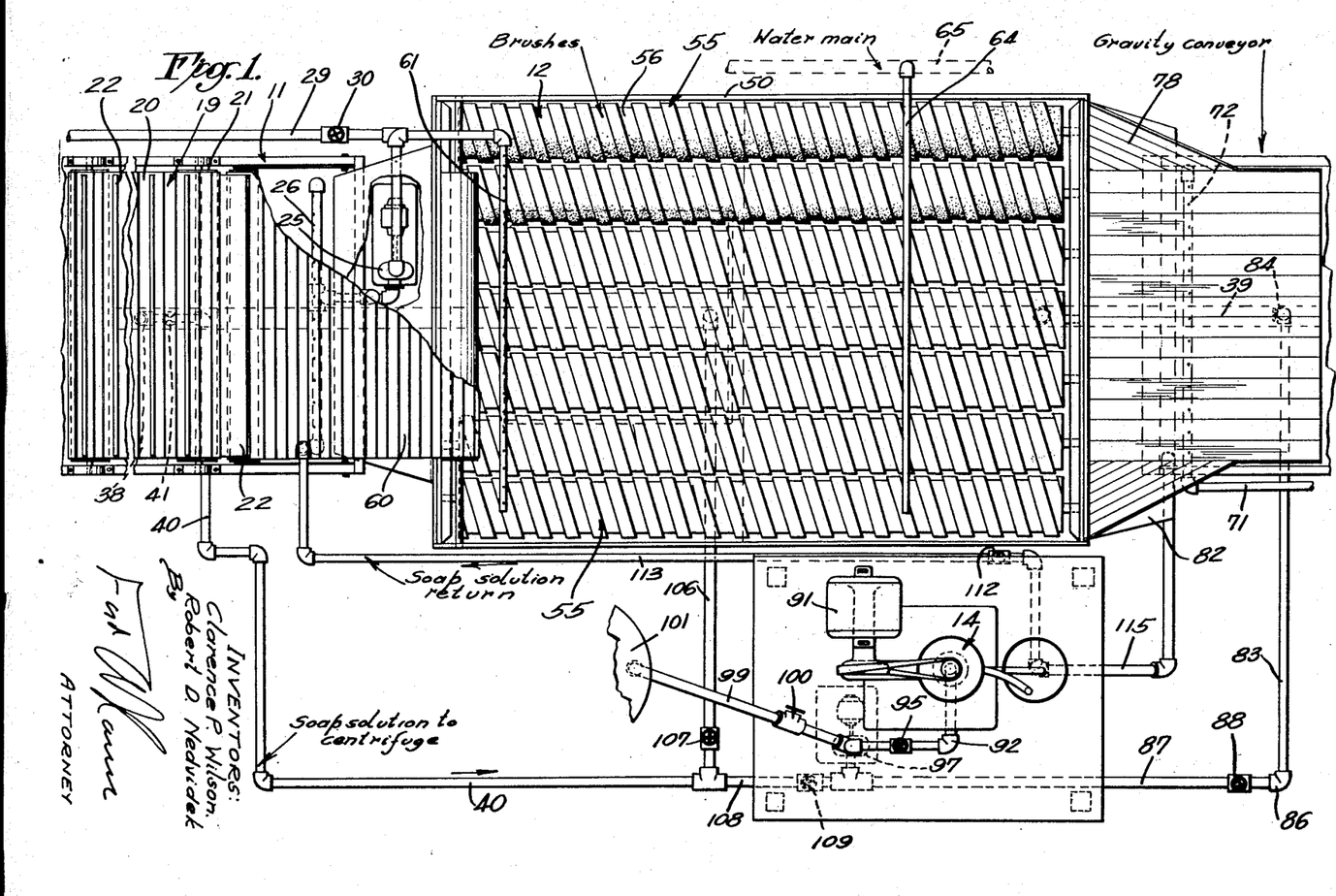
Figs. 1 and 2, taken together, comprise a fragmentary plan view of a preferred embodiment of the apparatus of our invention.
Figure 2:
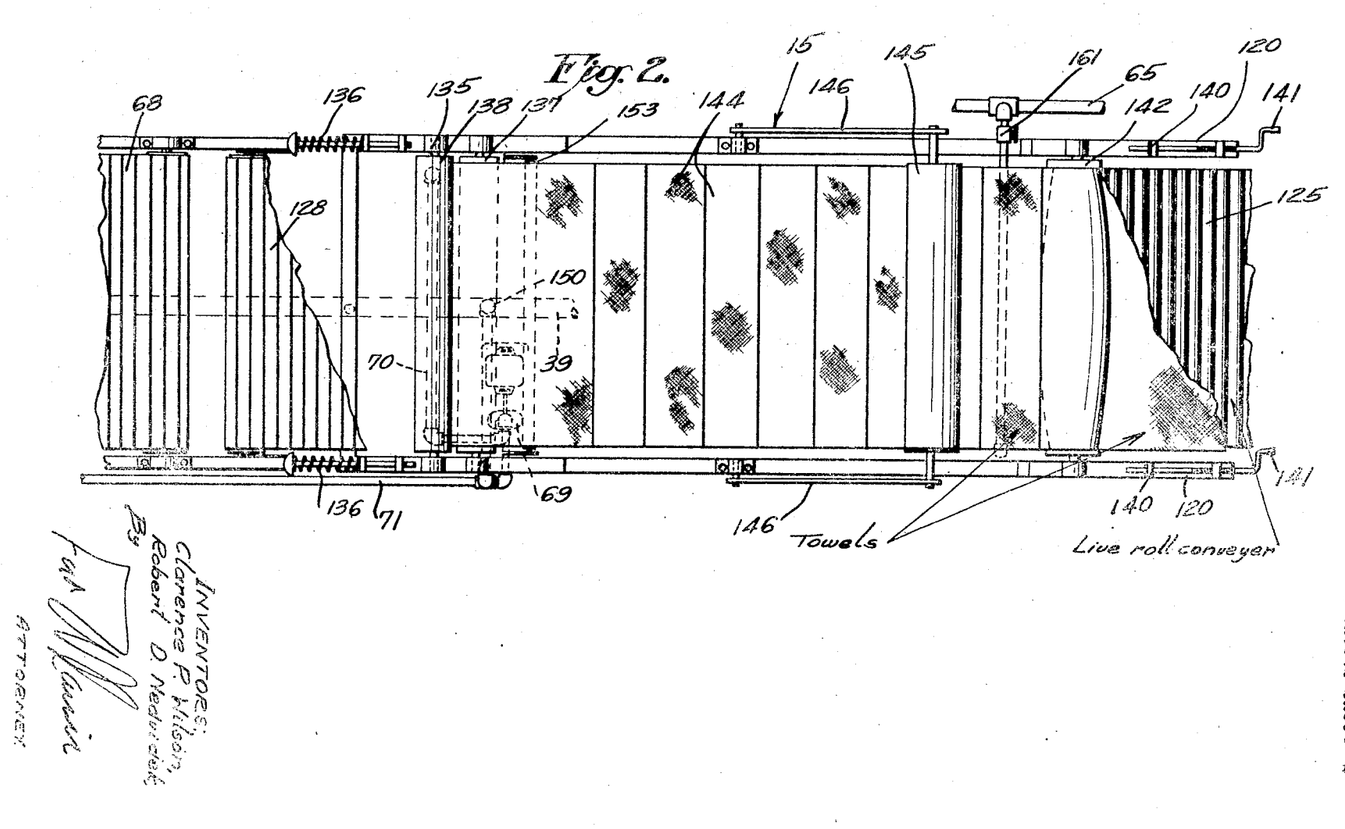
Figure 3:
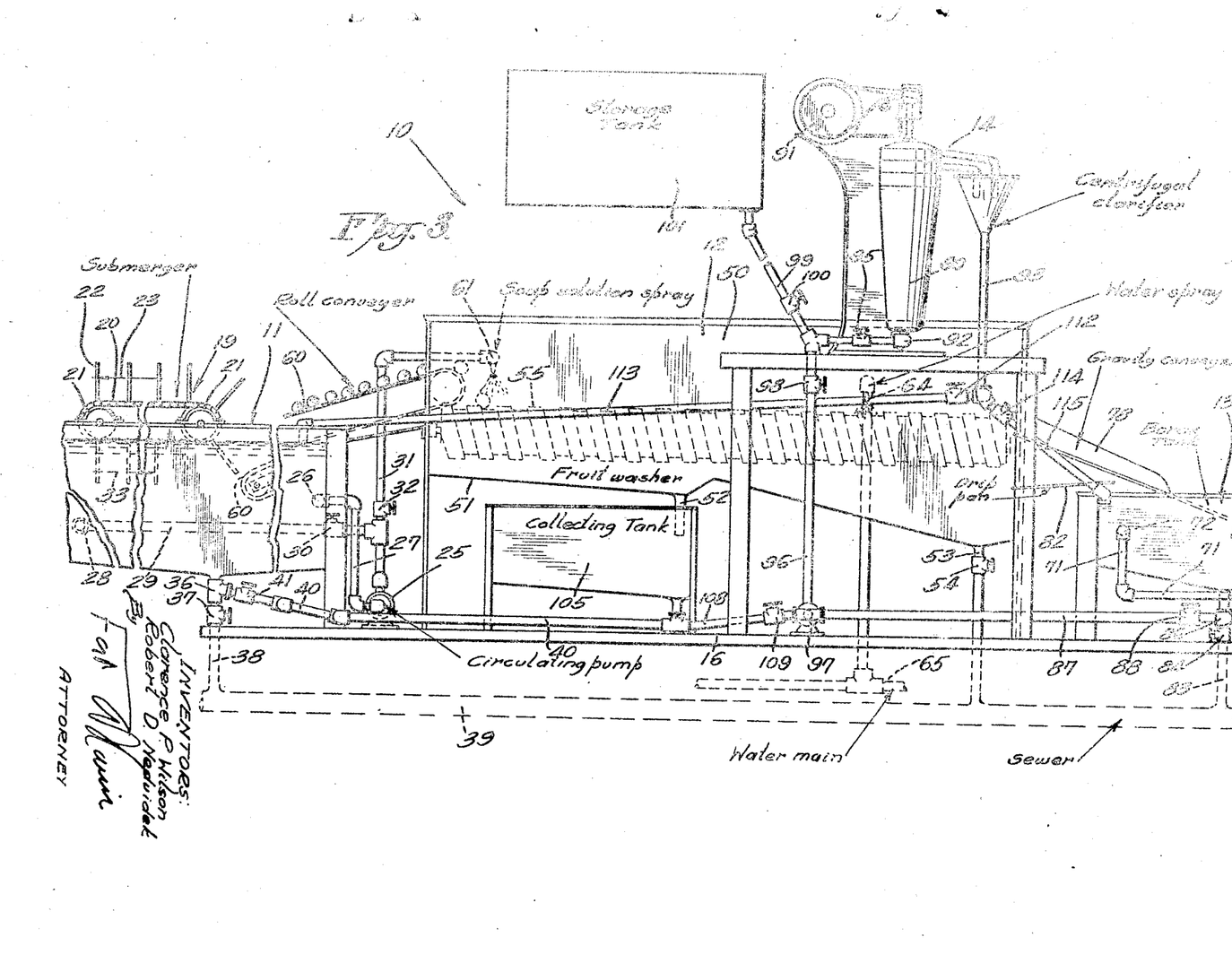
Figs. 3 and 4, taken together, form a side elevational view of the apparatus shown in Figs. 1 and 2.
Figures 4, 7:
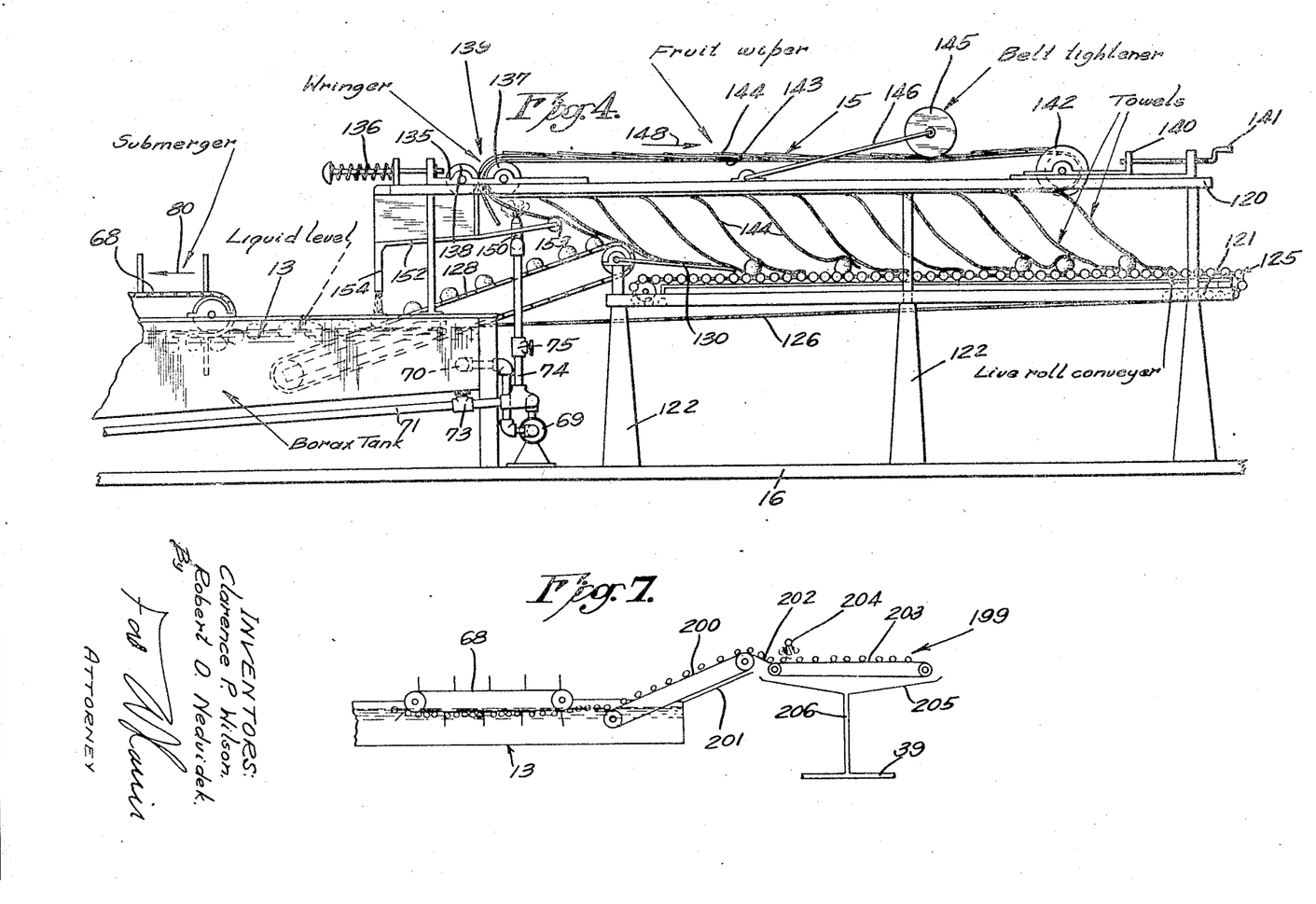
Fig. 7 is a diagrammatic view, illustrating a modified form of apparatus for conserving a treating liquid.

This wiper includes a pair of superimposed horizontal upper and lower frames 120 and 121 which are supported upon standards 122 resting upon the floor 16. Mounted on the lower frame 121 is a live roller conveyer 125, the upper flight of which moves from left to right, as shown in Fig. 4. The conveyer 125 is shown as horizontal, but may be inclined so as to elevate the fruit conveyed thereon. Opposite ends of the rollers in the upper flight of the conveyer 125 travel on tracks which rotate these rollers and thus cause the rotation of any fruit carried thereon. Mounted on the standards 122, beneath the conveyer 125 and sloping to the left so that the left-hand edge thereof is disposed over the right-hand end of the borax tank 13, is a drip pan 126. It is desired to point out here that the conveyer 125 and drip pan 126 are of considerable length, as this is a feature of importance in the operation of the wiper 15.

Mounted between the left-hand end of the frame 121, and upon the walls of the borax tank 13 so as to extend into the right-hand end of the latter, is an inclined endless belt elevator 128, which is provided with suitable operating mechanism so as to raise oranges from the right-hand end of the borax tank 13 and deposit these upon the left-hand end of the live roller conveyer 125. Mounted on the right-hand end of the elevator 128 is a bridge 130 upon which the oranges are adapted to run from the highest point of the elevator 128 onto the conveyer 125.

Slidably mounted on the left-hand end of the upper horizontal frame 120 is a pair of duplex bearings 135 which are yieldably urged leftward by spring mechanisms 136. Rotatably journalled in the bearings 135 are wringer rollers 137 and 138 which constitute a wringer 139. Slidably mounted on the right-hand end of the upper horizontal frame 120 is a pair of single bearings 140 which are manually adjustable by the operation of screw-crank mechanisms 141. Rotatably journalled in the bearings 140 is a belt pulley 142. Extending around the pulley 142 and the roller 137 is a wiper belt 143, having wiper towels 144 secured by one edge thereto. A belt tightening roller 145 is mounted on arms 146 which are pivotally connected with the upper frame 120 so that the weight of the roller 145 rests downward on the belt 143. Suitable means, not shown, is provided for driving the belt pulley 142 so as to rotate the belt 143 in the direction of arrow 148 and cause the towels 144 to be dragged from right to left over fruit carried from left to right on the upper flight on the live roller conveyer 125. In a manner well known in the art, the fruit carried on the live roller conveyer 125 is rotated in the opposite direction to that in which the rollers of this conveyer are rotated. Thus, the entire surfaces of the oranges carried on the conveyer 125 are subjected to the wiping action of the towels 144.

The distance between the rollers 137 and 138 is shown in the diagrammatic illustration of Fig. 4 as fixed, but it is to be understood that according to the practice in the art, these rollers may be adjustable relative to each other so that any desired pressure may be brought to bear upon the towels 144 in the wringer 139.

The pipe 74, previously mentioned, extends upward beyond the valve 75 and is provided with a nozzle 150 which is adapted to direct a spray of borax solution upon the towels 144 just before these pass through the wringer 139. This is accomplished by leaving the valve 75 slightly open during the operation of the borax solution circulating pump 69. Disposed above the conveyer 128 and below the upper end of the nozzle 150 is a drip pan 152, the right-hand edge of which has a roller 153 over which the towels 144 pass, and the left-hand edge of which is provided with a drain spout 154 which discharges any liquid, dripping into the pan 152 from the towels 144, into the right-hand end of the tank 13.

The belt 143 moves at a fairly slow rate so that there is a considerable evaporation of water therefrom and a tendency thus to concentrate any borax solution carried by the towels 144. This concentration would eventually result in crystallization of borax from the solution if this solution were not diluted by the spray from the nozzle 150 which practically fills the towels 144 with borax solution of normal strength. The borax solution wiped from the oranges is thus diluted and, when wrung from the towels by the wringer 139, drips onto the drip pan 152 and is returned by the spout 154 to the borax tank 13.

It is to be understood, however, that when a sufficient amount of water evaporates from the towels 144 to make it possible, the nozzle 150 may be connected with the fresh water main 65 so that fresh water is sprayed upon the towels instead of a solution of borax. In case this is done, the towels 144 will be practically free of borax when they first contact the oranges on the right end of the conveyer 125.

This results in the fruit discharged from the right-hand end of the conveyer 125 being not only practically dry, but almost entirely free from borax which, as previously mentioned, causes white spots on the oranges where the borax solution is allowed to dry on the oranges. It is also desired to point out that this is accomplished with a very small loss of borax solution.

In case it is desired, the extremely small amount of borax adhering to the oranges when these leave the wiper 15 may be removed by a suitable dry brush polisher, several types of which are well known in the art.

From the above description of the apparatus 10 and its operation, it will be seen that we have produced a method of and apparatus for applying a liquid treatment to fruit in which the treating liquid is applied with a marked economy in comparison with similar methods in general use at present.

While we have shown but a single type of wiper 15, it is to be understood that any suitable device for removing a liquid from the surface of the fruit without materially diluting that liquid or injuring the fruit might be used in place of the wiper 15.

Figure 5:
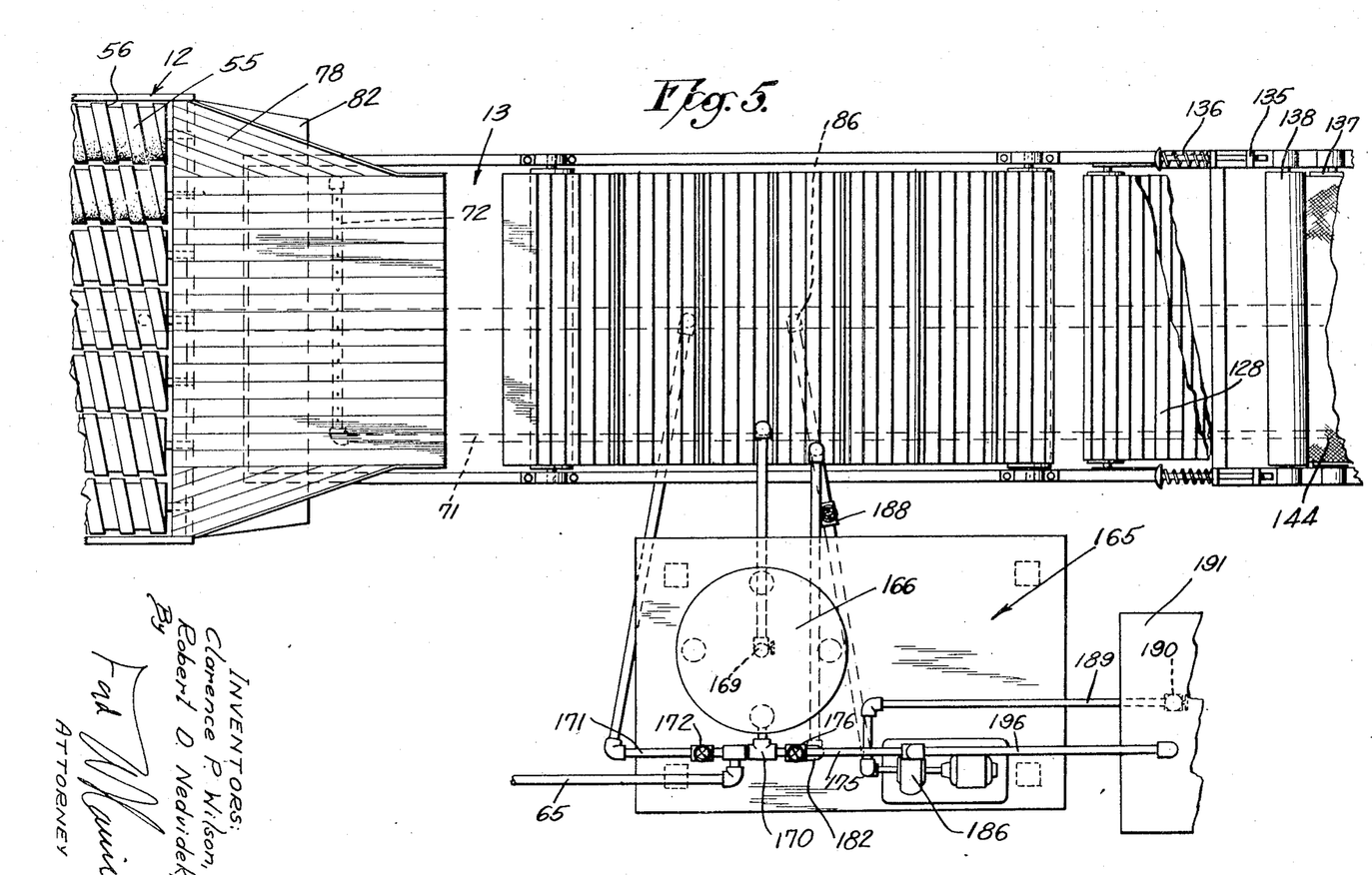
Fig. 5 is a plan view of a modified form of the clarifying apparatus of our invention.
Figure 6:
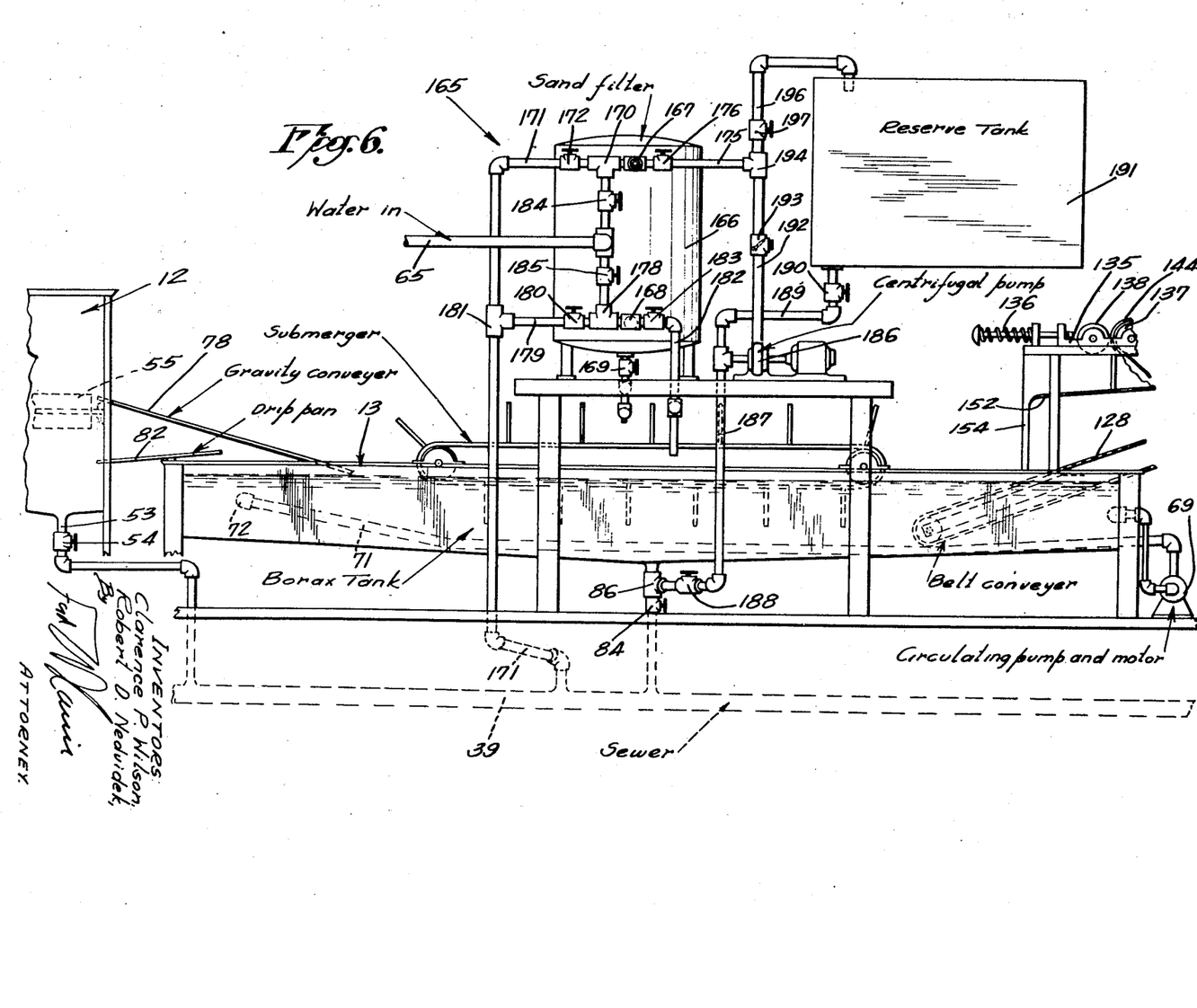
Fig. 6 is a side elevational view of the clarifier shown in Fig. 5.

Referring now to Figs. 5 and 6, a filtering apparatus 165 is shown which may be used for clarifying the borax solution in the borax tank 13 when an inexpensive clarifying apparatus is desired and when clarification of a soap solution is not necessary.

The filtering apparatus 165 includes a filtering tank 166 having an upper port 167 and a lower port 168, as well as a drain pipe 169 provided in the bottom thereof. The port 167 connects through a fitting 170 with a pipe 171 having a valve 172, the pipe 171 extending downward and connecting with the sewer pipe 39. The upper port 167 also connects with a pipe 175 having a valve 176. The port 168 connects through a fitting 178 to a pipe 179 having a valve 180. The pipe 179 connects with the pipe 171 through a fitting 181. The port 168 also connects with a pipe 182 which has a valve 183 and which extends downward and then transversely, so that the lower end discharges over the borax tank 13. The fresh water main 65 is connected through suitable piping with the fittings 170 and 178 through valves 184 and 185 respectively, for a purpose to be described hereinafter. A centrifugal circulating pump 186 is provided, the intake end of which is connected to a pipe 187 which has a valve 188 and which connects with the drain fitting 86 of the borax tank 13. Also connecting with the intake end of the pump 186 is a pipe 189 which has a valve 190 and which connects with the bottom of a reserve tank 191. Connecting with the discharge end of the pump 186 is a pipe 192, having a check valve 193 connecting through a fitting 194 wih the pipe 175 and also with a pipe 196 having a valve 197 and discharging downward into the upper end of the reserve tank 191.

The filtering tank 166 is filled with strata of sand of varying degrees of coarseness, or with any other suitable solid filtering material, many of which are well known in the art. The clarification of a liquid accomplished by the filtering apparatus 165 is due to retention of suspended matter from the liquid to be filtered by the strata of sand in the tank 166.

The apparatus 165 may be utilized to continuously or intermittently clarify the borax solution in the tank 13 in a similar manner as previously described for the clarifier 14.

When the apparatus 165 is continuously operated, the valves 84, 190, 197, 172, 184, 185, 180, and 169 are closed, and the valves 188, 176, and 183 are opened. The centrifugal pump 186 is now set in motion so as to draw borax solution from the bottom of the tank 13 and discharge this upward through the pipe 192, the check valve 193, the pipe 175, and valve 176 into the upper port 167 of the filtering tank 166. The borax solution thus discharged into the upper end of the tank 166 filters downward through the various strata therein and is discharged through the lower port 168 from which it passes through the pipe 182 back to the borax tank 13. The filtering of the borax solution may be continued in this manner until the solution discharged from the pipe 182 indicates that the interstices of the sand in the tank 166 have become filled with matter removed from the solution, and that the sand has therefore ceased to completely clarify the solution. When this happens, the pump 186 is shut down, and the borax solution present in the filter tank 166 is allowed to drain out of the sand by gravity, this solution flowing through the lower port 168 and the pipe 182 into the borax tank 13. The valves 188, 176, and 183 are now shut, and the valves 185 and 172 opened. This admits fresh water under pressure from the fresh water main 65 through the valve 185 and the fitting 178 into the lower end of the filtering tank 166. This fresh water travels upward through the sand strata in the tank 166 and out through the upper port 167, from which it flows through the valve 172 and pipe 171 into the sewer pipe 39. This flushing action is termed "back-washing" and is continued until the sand in the tank 166 is cleaned, after which the continuous filtration of the borax solution is taken up again as previously described.

The intermittent clarification of the borax solution by the apparatus 165 is started with the valves 172, 184, 185, 180, 169, 84, 176, and 190 closed, and with the valves 188, 197, and 183 opened. The pump 186 is now set in operation so that the borax solution is drawn from the bottom of the tank 13 and forced upward through the pipes 192 and 196 into the reserve tank 191. When the tank 13 is empty, the valves 188, and 197 are closed, and the valves 190 and 176 are opened. At this time, the valve 84 is temporarily opened to permit the cleaning of the tank 13, as previously described, after which this valve is closed. The pump 186 is again set in operation so as to draw borax solution from the reserve tank 191 through the pipe 189 and discharge it upwardly through the pipes 192 and 175 into the upper end of the sand filter 166. The borax solution, filtered by its downward passage through the sand in the tank 166, is discharged through the lower port 168 and the pipe 182 into the borax tank 13.

In the apparatus 165, the reserve tank may be at any desired level as the solution is transferred to and from the reserve tank by the operation of the pump 186. The filtering apparatus 165 is preferably used only for clarifying the borax solution because this type of filter in its present development is not successful in clarifying soap solutions.

Referring now to Fig. 7, we will describe a fruit rinsing apparatus 199 which includes the tank 13 and submerger 68, as well as an endless belt conveyer 200 extending into the right-hand end of the tank 13 for the purpose of removing oranges therefrom. The conveyer 200 is preferably considerably longer than the conveyer 128, shown in Fig. 4, and is provided with a drip pan 201 for receiving any treating solution, which drips from the conveyer 200, and returning this solution to the tank 13. At the right-hand end of the conveyer 200, oranges carried thereon are transferred by a bridge 202 to the left-hand end of a rinse conveyer 203 of the endless belt type. Disposed transversely across the left-hand end of the rinse conveyer 203 is a fresh water pipe 204 having perforations through which fresh water is sprayed onto the oranges passing therebeneath. Disposed under the rinse conveyer 203 is a drip pan 205 connected by a pipe 206 with the sewer 39.

In using the rinse apparatus 199, it will be noted that the only objects leaving the solution in the tank 13 from which borax solution is removed so that they do not return to the tank 13 are the oranges themselves. In other words, none of the borax solution, adhering to the conveyer 200, is rinsed therefrom, as the rinse spray is not directed on the oranges until they are transferred by the bridge 202 onto the conveyer 203 which does not come in direct contact at any time with the borax solution in the tank 13.

We have found that it has previously been customary in orange packing houses to spray the rinse water upon the oranges while they were still traveling upon the conveyer which extends into the tank 13, so that the borax solution adhering to this conveyer would be washed off and carried with the used rinse water to the sewer. This resulted in a great amount of borax solution being constantly removed from the tank 13 and wasted. When a simple and inexpensive apparatus is desired for effecting a considerable saving in the amount of treating solution used, the apparatus 199 is recommended. Endless belt conveyers of the type suitable to perform the functions of the conveyers 200 and 203 are already in use for various purposes in the majority of orange packing houses.

The economies effected by the above described apparatus are evident in the following comparison of the amounts of boron compounds used in a packing house before and after the installation of this apparatus in this house. The packing house in which the test was conducted handled 388,717 field boxes of oranges in one year.

*Before installation of treating liquid conserving apparatus*

| | Pounds of boron compounds | Percent of total boron compounds |
|---|---|---|
| Borax treating tank—discarded 4 times yearly | 1,328 | 3.67 |
| Borax added to soap soaking tank to prevent putrefaction—discarded 32 times yearly | 4,576 | 12.66 |
| Drip from fruit conveyer | 8,603 | 23.79 |
| Rinse water | 19,073 | 52.75 |
| Total boron discarded | 33,580 | 92.87 |
| Carried out on rinsed fruit | 2,579 | 7.13 |
| Total | 36,159 | 100.00 |

*Borax saved by using apparatus 199*

| | Pounds of boron compounds | Percent of total boron compounds |
|---|---|---|
| Borax added to soap soaking tank | 4,576 | 12.66 |
| Borax treating tank | 1,328 | 3.67 |
| Rinse water | 5,675 | 15.69 |
| Drip from conveyer | None. | |
| Cleaning tanks and fruit wiper | | |
| Total borax discarded | 11,579 | 32.02 |
| Carried out on treated fruit | 2,579 | 7.13 |
| Total borax saved per year | 22,001 | 60.85 |
| Total | 36,159 | 100.00 |

*Borax saved by using no borax in the soap soluton but sterilizing this by heat during its return from the clarifier, and using the centrifugal clarifier 14 and fruit wiping device 15*

| | Pounds of boron compounds | Percent of total boron compounds |
|---|---|---|
| Borax added to soap soaking tank | None. | |
| Borax treating tank | None. | |
| Rinse water | None. | |
| Drip from conveyer | None. | |
| Cleaning tanks and fruit wiper | 524 | 1.45 |
| Total borax discarded | 524 | 1.45 |
| Carried out on treated fruit | 2,579 | 7.13 |
| Total borax saved per year | 33,056 | 91.42 |
| Total | 36,159 | 100.00 |

We claim as our invention:

In an apparatus for treating fruit, the combination of: a tank for containing a body of treating solution; means for causing a continuous movement of fruit through said solution; an elevating conveyer against which said fruit is directed by said means; means for returning to said body of solution that portion of said solution which drains from said fruit on said elevating conveyer; a rinse conveyer, the receiving end of which is disposed below the discharge end of said elevating conveyer; gravity means for transferring fruit from said elevating conveyer to said rinse conveyer; means for applying relatively clear water to said fruit on said rinse conveyer to rinse the remainder of solution therefrom; and means independent of said tank for receiving and disposing of said used rinse water.

In testimony whereof, we have hereunto set our hands at Ontario, California, this 27 day of February, 1928.

CLARENCE P. WILSON.
ROBERT D. NEDVIDEK.